United States Patent
Mackey

(10) Patent No.: US 8,854,333 B2
(45) Date of Patent: Oct. 7, 2014

(54) POLAR SENSOR PATTERNS

(75) Inventor: Bob Lee Mackey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 1943 days.

(21) Appl. No.: 11/511,947

(22) Filed: Aug. 28, 2006

(65) Prior Publication Data

US 2007/0057167 A1  Mar. 15, 2007

Related U.S. Application Data

(60) Provisional application No. 60/719,748, filed on Sep. 9, 2005.

(51) Int. Cl.
*G09G 5/00* (2006.01)
(52) U.S. Cl.
USPC ............ 345/174; 345/173; 345/175; 345/156
(58) Field of Classification Search
USPC .................................. 345/174, 173, 175, 156
See application file for complete search history.

(56) References Cited

U.S. PATENT DOCUMENTS

| | | | |
|---|---|---|---|
| 4,578,654 A * | 3/1986 | Tait | 333/175 |
| 4,736,191 A | 4/1988 | Matzke et al. | |
| 7,071,685 B2 * | 7/2006 | Saltsov et al. | 324/240 |
| 7,202,859 B1 * | 4/2007 | Speck et al. | 345/174 |
| 7,218,124 B1 | 5/2007 | Mackey et al. | |
| 7,382,139 B2 | 6/2008 | Mackey | |
| 2003/0076306 A1 | 4/2003 | Zadesky et al. | |
| 2004/0239650 A1 | 12/2004 | MacKey | |

FOREIGN PATENT DOCUMENTS

WO  WO-03/088176  10/2003

* cited by examiner

*Primary Examiner* — William Boddie
*Assistant Examiner* — Leonid Shapiro

(57) ABSTRACT

Patterns of sensor elements that can be used in capacitance sensing devices are described. A plurality of sensor elements extends in a radial direction from a shared center. A first subset of the sensor elements extend like spirals in a clockwise direction, and a second subset of the sensor elements extend like spirals in a counterclockwise direction.

20 Claims, 13 Drawing Sheets

310

700

Receive signals output by sensor elements arranged in a clockwise and counterclockwise spiral-like pattern
71

Use the signals to determine a position within a sensing region
72

POLAR SENSOR PATTERNS

RELATED U.S. APPLICATION

This application claims priority to the provisional patent application Ser. No. 60/719,748, entitled "Polar Sensor Patterns," with filing date Sep. 9, 2005, assigned to the assignee of the present application, and hereby incorporated by reference in its entirety.

BACKGROUND

Continuing advancements in electronic technology have led to the development of touch sensing technology for registering positional information and receiving user input. Within the broad category of touch sensing technology there exist capacitive sensing touch sensors, commonly referred to as capacitive touchpads or simply touchpads. In a touchpad, capacitance sensor elements are distributed underneath a sensing surface. When a user's finger (or some other type of object) is placed on the sensing surface, a capacitance is induced in the sensor elements.

Many of today's electronic devices now employ a touchpad as a user interface. Such devices include, but are not limited to, digital cameras, portable music players, personal digital assistants, portable laptop computers, cell phones, and touch screen display devices. For reasons of aesthetics and/or convenience of use, many of these types of devices utilize a round touchpad.

Conventional round touchpads commonly fall into two categories: round touchpads that measure angle only (e.g., jog dials, scroll dials, and the like); and round touchpads that measure a two-dimensional position using a truncated rectangular grid of sensor elements. Round touchpads that measure angle provide only one axis of positioning information—that is, they can measure an angle in the circumferential direction, but they cannot discern distance in the radial direction.

Round touchpads that use a truncated rectangular sensor grid can be problematic because some of the sensor elements are shorter in length than others. A background capacitance measured on a longer sensor element may be different from a background capacitance measured on a shorter sensor element. Furthermore, longer and shorter sensor elements may respond differently to the same object. Some type of compensating effect may be applied to the sensor output signals in order to offset the effect of unequal sensor element length.

Accordingly, a touchpad that can be used to accurately indicate the position of an object or finger, but that avoids the problems mentioned above, would be advantageous.

SUMMARY

Embodiments of the present invention provide touchpads that provide accurate position information but do not share the problems of conventional touchpads. In one embodiment, a sensor pattern includes a plurality of sensor elements emanating outward from a center position. A first subset of the sensor elements extend like spirals in a clockwise direction, and a second subset of the sensor elements extend like spirals in a counterclockwise direction. In one such embodiment, the background capacitance is substantially equal for each sensor element in the plurality of sensor elements, and each sensor element is substantially equally sensitive to an object to be sensed.

These and other objects and advantages of the present invention will no doubt become obvious to those of ordinary skill in the art after having read the following detailed description of the various embodiments which are illustrated in the various drawing figures.

The drawings referred to in this description should not be understood as being drawn to scale except if specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Various embodiments of the present invention are discussed primarily in the context of a sensor pattern for implementation in a touchpad within or on an electronic device such as, but not limited to, a portable music player, a personal data assistant, a laptop or other computer system configured with a touchpad, or a display device configured with touch screen functionality, a digital camera, a printer, or an externally connectable touchpad.

Figure 1A:
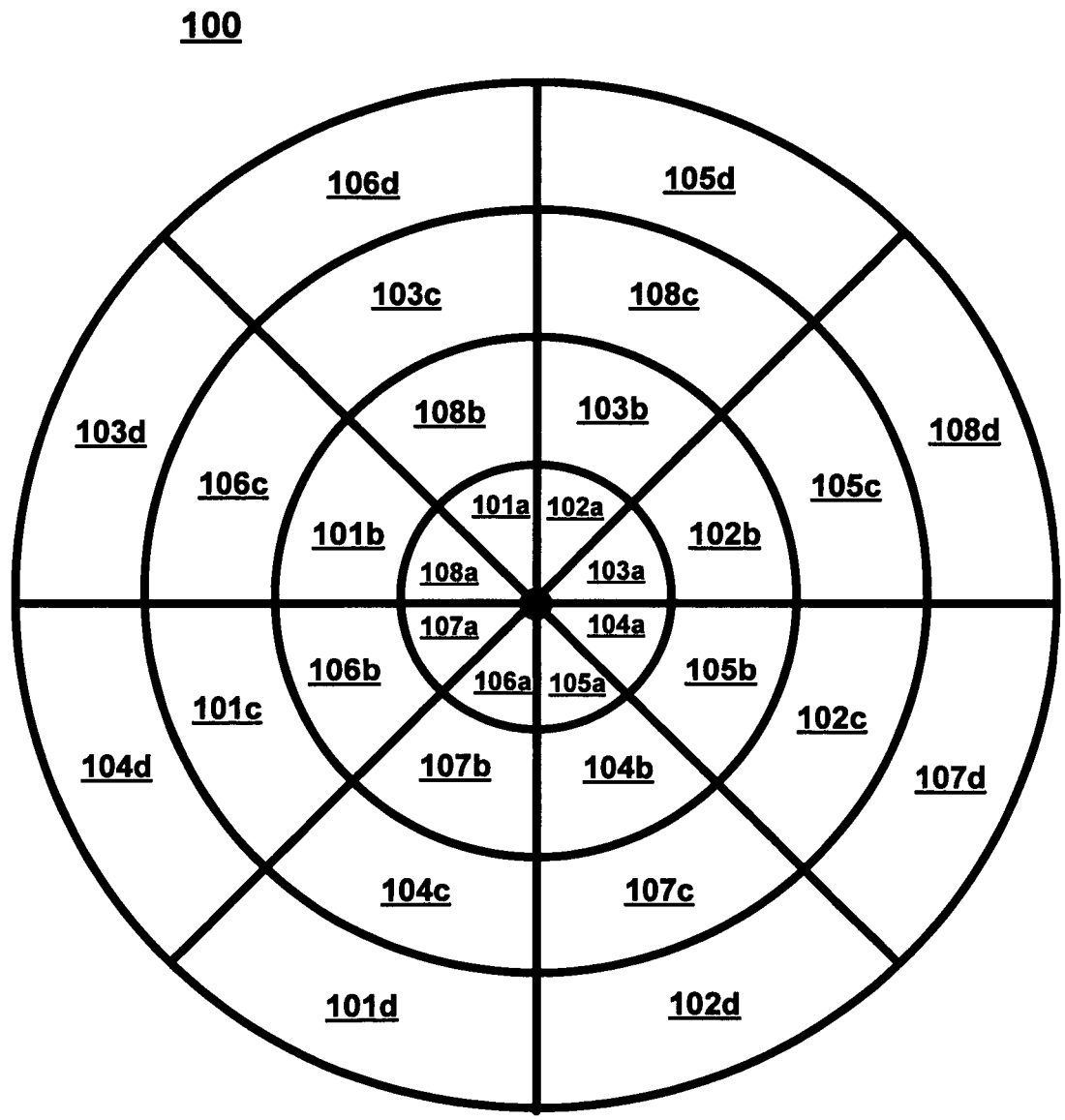
FIG. 1A illustrates a sensor pattern in accordance with an embodiment of the present invention.

FIG. 1A is an illustration of a sensor pattern 100 in accordance with an embodiment of the present invention. Sensor pattern 100 may be referred to as a polar diamond sensor pattern. In the example of FIG. 1A, pattern 100 includes eight sensor elements 101, 102, 103, 104, 105, 106, 107 and 108 (101-108); however, the present invention is not so limited. The sensor elements 101-108 can be composed of copper or other conductive material having similar characteristics. The sensor elements are electrically insulated from each other.

Each of the sensor elements 101-108 consists of some number of segments or portions. For example, sensor element 101 includes portions 101a, 101b, 101c and 101d (101a-d). Each portion is electrically insulated from surrounding portions; however, the portions that constitute a particular sensor element are electrically connected. That is, for example, the portions 101a-d are electrically connected in series. Alternatively, the portions 101a-d can be connected in parallel through vias to a shared electrical connector. Other ways of connecting the portions of a sensor element may be used. In the example of FIG. 1A, each sensor element 101-108 includes four portions; however, the present invention is not so limited.

In the embodiment shown, four of the sensor elements (e.g., elements 101, 103, 105 and 107) extend outward from the center of pattern 100 in a spiral-like manner in a counterclockwise direction. Further, four of the sensor elements (e.g., elements 102, 104, 106 and 108) extend outward from the center of pattern 100 in a spiral-like manner in a clockwise direction.

As used herein, the term "spiral-like" encompasses the term "spiral;" however, the term "spiral-like" is used because the term "spiral" can imply a smooth or continuous curve, and embodiments in accordance with the present invention are not so limited.

Each sensor element 101-108 is symmetrically related in some manner to each other sensor element. In the present embodiment, the subset of counterclockwise-spiraling sensor elements 101, 103, 105 and 107 are related to each other by rotation symmetry (but not reflection symmetry), the subset of clockwise-spiraling sensor elements 102, 104, 106 and 108 are related to each other by rotation symmetry (but not reflection symmetry), and the counterclockwise-spiraling sensor elements 101, 103, 105 and 107 are related to the clockwise-spiraling sensor elements 102, 104, 106 and 108 by reflection symmetry (but not rotation symmetry). This is demonstrated more clearly in FIGS. 1B and 1C. All of the sensor elements 101-108 are symmetrically related by a combination of reflection and rotation symmetry operations.

Figure 1B:
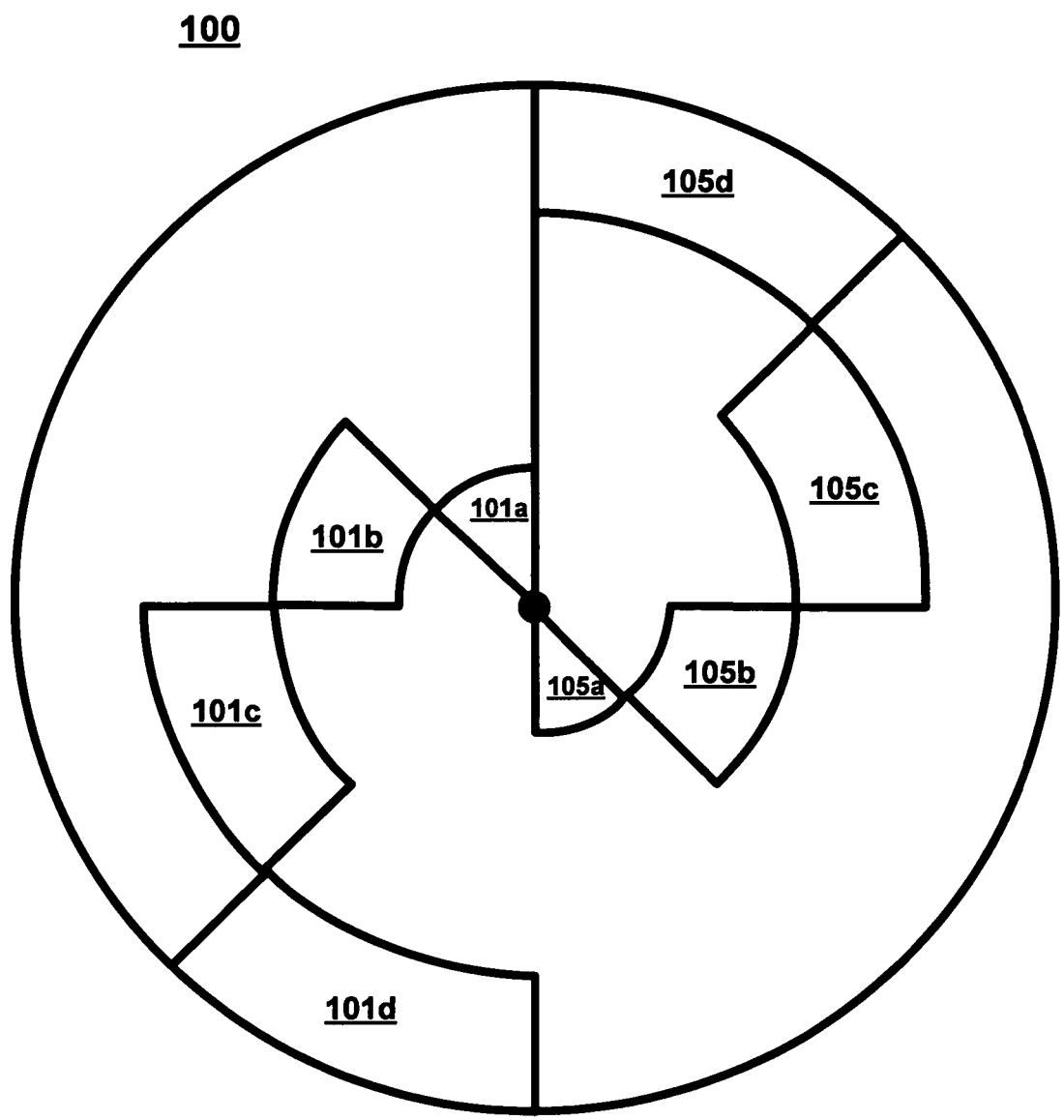
FIG. 1B illustrates rotation symmetry between sensor elements in the sensor pattern of FIG. 1A.

In FIG. 1B, two sensor elements 101 and 105, both of which are in the subset of counterclockwise-spiraling sensor elements, are highlighted. The sensor elements 101 and 105 have rotation symmetry but not reflection symmetry. More specifically, the sensor elements 101 and 105 have 180-degree rotation symmetry. In the example of FIG. 1A, the subset of counterclockwise-spiraling sensor elements 101, 103, 105 and 107 have 90 degree rotation symmetry, and similarly the subset of clockwise-spiraling sensor elements 102, 104, 106 and 108 have 90 degree rotation symmetry.

Figure 1C:
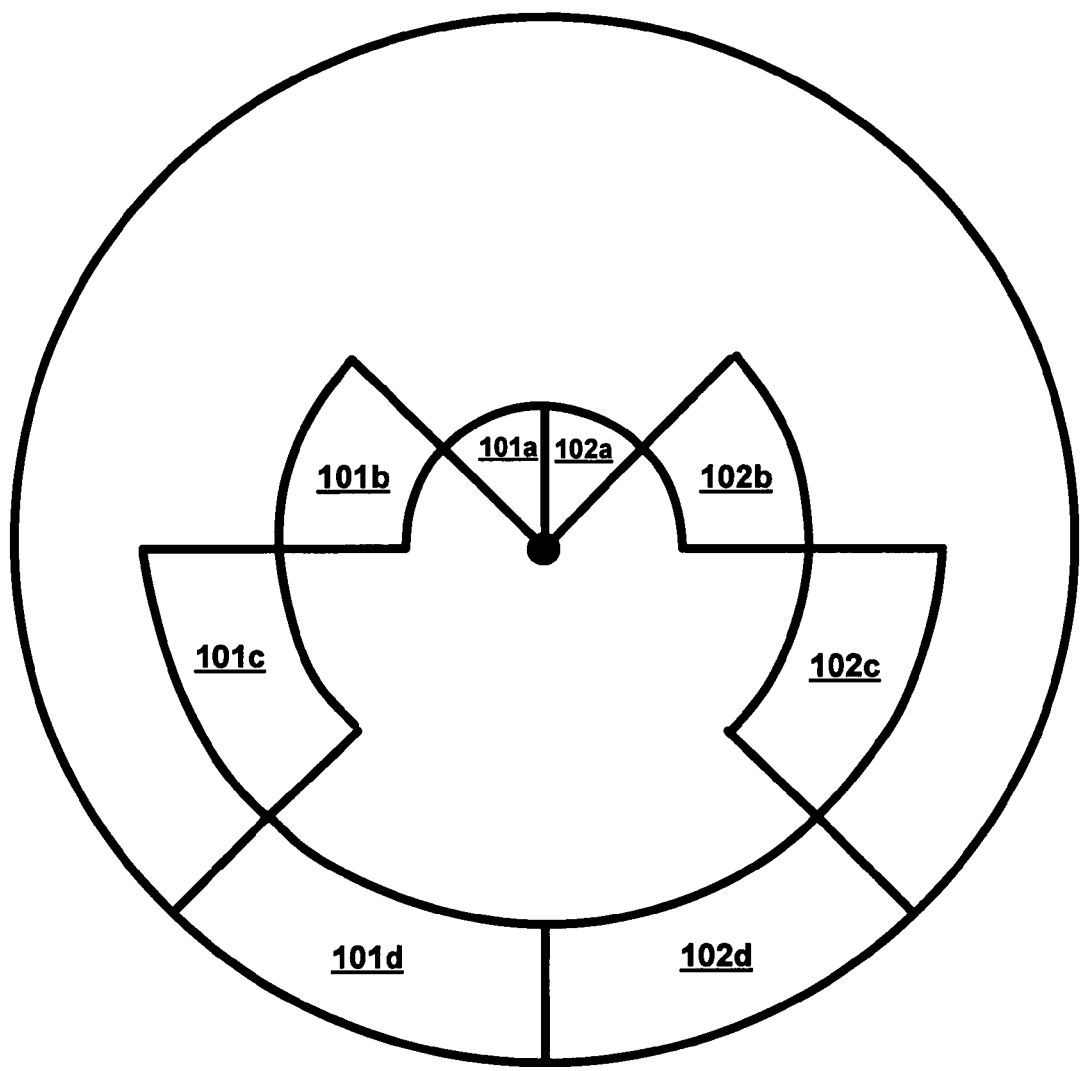
FIG. 1C illustrates reflection symmetry between sensor elements in the sensor pattern of FIG. 1A.

In FIG. 1C, two sensor elements 101 and 102 (a sensor element from the subset of counterclockwise-spiraling sensor elements, and a sensor element from the subset of clockwise-spiraling sensor elements) are highlighted. The sensor elements 101 and 102 have reflection symmetry but not rotation symmetry.

The sensor pattern 100 of FIG. 1A can be used to implement a two-dimensional (e.g., radius r and angle θ) sensor design that is not only symmetrical, but is also balanced. In other words, the sensor elements 101-108 each have a substantially equal surface area, a substantially equal length, and a substantially equal sensitivity. Each portion of the sensor elements 101-108 has substantially the same surface area as the other, corresponding portions—that is, for example, portion 101c has substantially the same surface area as portion 102c.

Therefore, a measured background capacitance (an amount of capacitance measured on each sensor element in the absence of an object to be sensed) is substantially the same for each sensor element 101-108. Also, each sensor element 101-108 will respond in substantially the same manner to an object to be sensed.

In general, an "object" or "object to be sensed" refers to things that, in whole or in part, can be brought into or removed from contact with a surface of a sensing region or can be moved closer to or further from the sensor elements, and vice versa. Within that general definition of object, an object may be a user's finger, a stylus, a probe or a similar type of object.

Figure 1D:
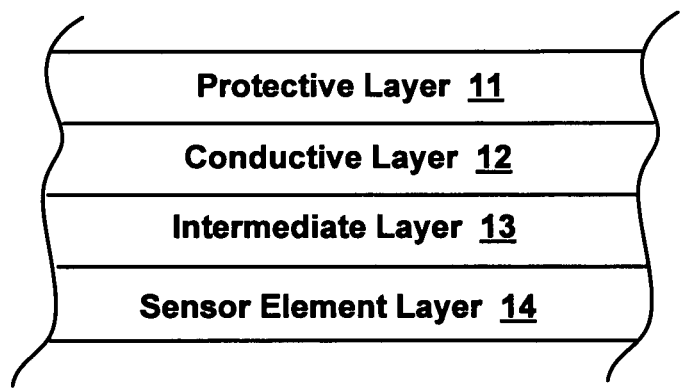
FIG. 1D is a cross-sectional view of a portion of a capacitance sensing apparatus according to one embodiment of the present invention.

Within the general definition of object, with reference to FIG. 1D, an object may also include a deformable conductive surface 12 that is disposed (layered) over the sensor elements 101-108 (sensor element layer 14). The sensor element layer 14 may consist of multiple layers—for example, the sensor elements 101-108 may be implemented in two or more layers, perhaps formed on either side of an intervening substrate (not shown). A protective surface 11 may be disposed (layered) over the conductive surface 12. The conductive surface 12 may be separated from the sensor elements 101-108 by another layer 13 of deformable material, such as a compliant foam material that may or may not also incorporate air gaps. In operation, the conductive surface 12 deforms when another object (such as a user's finger, etc.) is, for example, pressed against the conductive surface, moving the conductive surface closer to the sensor elements 101-108. By decreasing the distance between the conductive surface and the sensor elements 101-108, an increase in capacitance is induced in the sensor elements. There may be layers or components in addition to those shown in FIG. 1D.

Figure 1E:
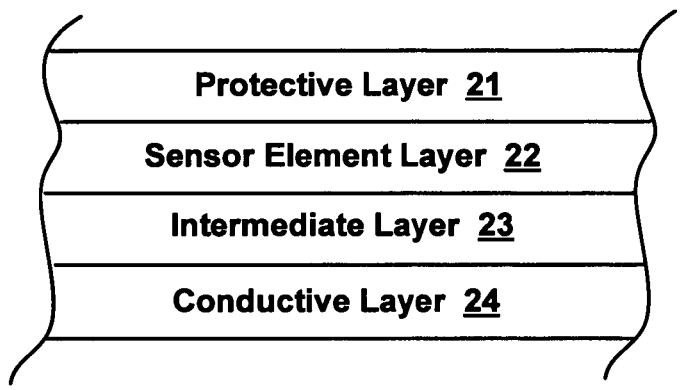
FIG. 1E is a cross-sectional view of a portion of a capacitance sensing apparatus according to another embodiment of the present invention.

Within the general definition of object, with reference to FIG. 1E, an object may also include a rigid or substantially rigid conductive surface 24 that is disposed (layered) under (or over) sensor elements 101-108 (sensor element layer 22), where the sensor elements have some degree of flexibility. The sensor element layer 22 may consist of multiple layers— for example, the sensor elements 101-108 may be implemented in two or more layers, perhaps formed on either side of an intervening substrate (not shown). The conductive surface 24 may be separated from the sensor elements 101-108 by another layer 23 of deformable material, such as a compliant foam material that may or may not also incorporate air gaps. On the side opposite the conductive surface 24, a deformable protective surface 21 may be disposed (layered) over (or under) the sensor elements 101-108. In operation, the sensor elements 101-108 deform when another object (such as a user's finger, etc.) is, for example, pressed against the protective surface 21, moving the sensor elements closer to the conductive surface. By decreasing the distance between the conductive surface and the sensor elements 101-108, an increase in capacitance is induced in the sensor elements. There may be layers or components in addition to those shown in FIG. 1E.

The amount of capacitance induced by an object to be sensed is a function of the size (e.g., surface area) of the object and the size of the sensor element. Thus, with reference to FIG. 1A, a greater capacitance will be induced in portion 101*d* than in portion 101*c*, all other factors being equivalent.

In addition or as an alternative to measuring capacitance for each sensor element, the capacitance from one sensor element to another sensor element (across sensor elements) can be measured, and the change in that capacitance induced by an object can provide an indication of the object's position or proximity. The former approach may be referred to as an "absolute capacitance" sensing method, and the latter approach may be referred to as a "transcapacitance" sensing method.

Output signals from the sensor elements 101-108 are readily interpreted into a two-dimensional position by sensing circuitry coupled to the sensor elements (see FIG. 6, below). For example, one sensor axis (u) may consist of the clockwise-spiraling sensor elements 102, 104, 106 and 108. Another axis (v) may consist of the counterclockwise-spiraling sensor traces 101, 103, 105 and 107. Accordingly, a clockwise motion of a finger or other such object will show as motion in the +u, −v direction. Outward motion will show as +u, +v. To translate from u-v space to polar coordinates (r-θ space), a transform of the type r=u+v and θ=u−v can be used.

Because θ is inherently periodic and r is not, constraints may be placed on the sensor pattern design and on the coordinate transform. In the example of FIG. 1A, each sensor element 101-108 traverses an arc of less than or equal to 180 degrees. This can be seen more clearly in the examples of FIGS. 1B and 1C. By limiting the sensor elements to an arc of 180 degrees, a sensor element will cross over another sensor element no more than one time, so that an unambiguous position within sensor pattern 100 can be readily determined based on the output signals. (Each sensor element does not necessarily cross over all of the other sensor elements. For example, sensor element 101 crosses over sensor elements 108, 106 and 104 but not sensor element 102. Of course, sensor element 101 does not cross over other sensor elements that spiral in the same, e.g., counterclockwise, direction.) However, sensor elements that traverse arcs of more than 180 degrees are permissible, because the sensing circuitry can be programmed to recognize and decipher any ambiguities that may be introduced.

An object near or at the center of sensor pattern 100 may induce a signal on all of the sensor elements 101-108. The sensing circuitry can be programmed to recognize this singular condition. Accordingly, the position of the object can be readily identified as being at or near the center of sensor pattern 100. There may be some uncertainty in θ, but because r is so small in this situation, the uncertainty in θ results in little uncertainty.

Figure 2:
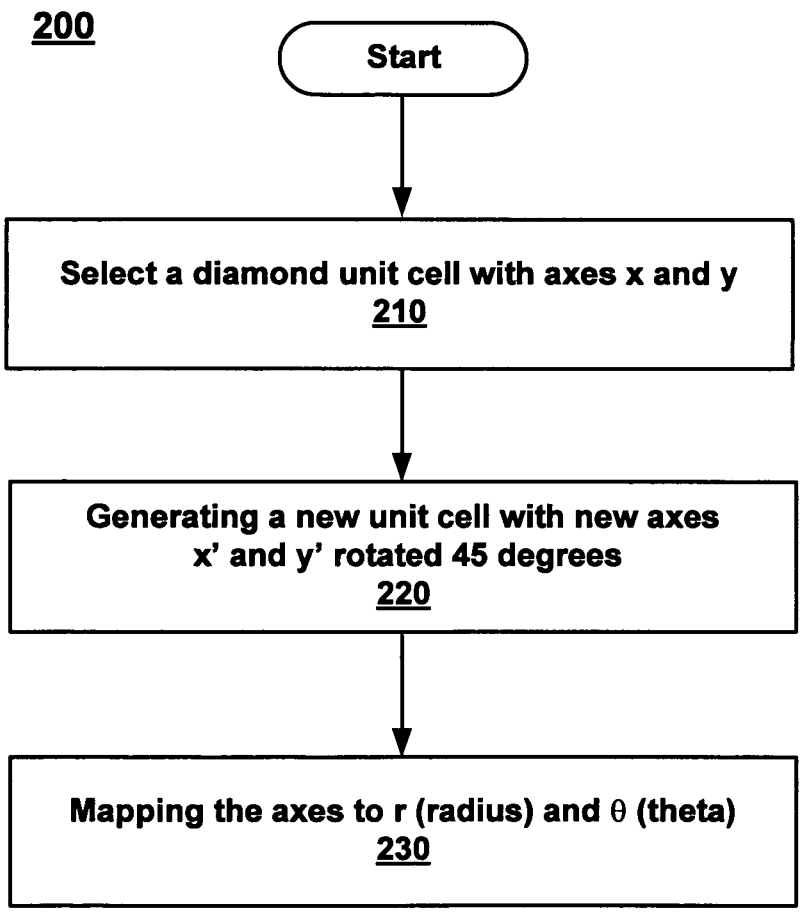
FIG. 2 is a flowchart describing the geometric construction of the sensor pattern of FIG. 1A in accordance with an embodiment of the present invention.

A geometric construction can be used to generate sensor pattern 100 of FIG. 1A. FIG. 2 is a flowchart 200 describing the geometric construction of sensor pattern 100 in accordance with an embodiment of the present invention.

In operation 210 of FIG. 2, a diamond cell unit oriented along the u and v axes is selected.

In operation 220, a new unit cell is generated, with new axes u' and v' rotated 45 degrees.

In operation 230, the new unit cell having new axes u' and v' are mapped to r (radius) and θ (theta), thus generating the sensor pattern 100.

In essence, sensor pattern 100 includes some number of sensor elements arranged in a pattern of radiating segments and concentric bands that intersect the radiating segments, akin to a dartboard. In the example of FIG. 1A, each radiating segment is pie-shaped and includes different portions of different sensor elements, and each concentric band is ring-shaped (except for the innermost band, which is circular) and includes different portions of different sensor elements. A first portion of a sensor element (e.g., portion 101*a* of sensor element 101) is located within a first radiating segment and within a first concentric band; a second portion of the sensor element (e.g., portion 101*b* of sensor element 101) is located within a second radiating segment adjacent to the first radiating segment and within a second concentric band that is adjacent to the first concentric band, and so on.

Figure 3A:
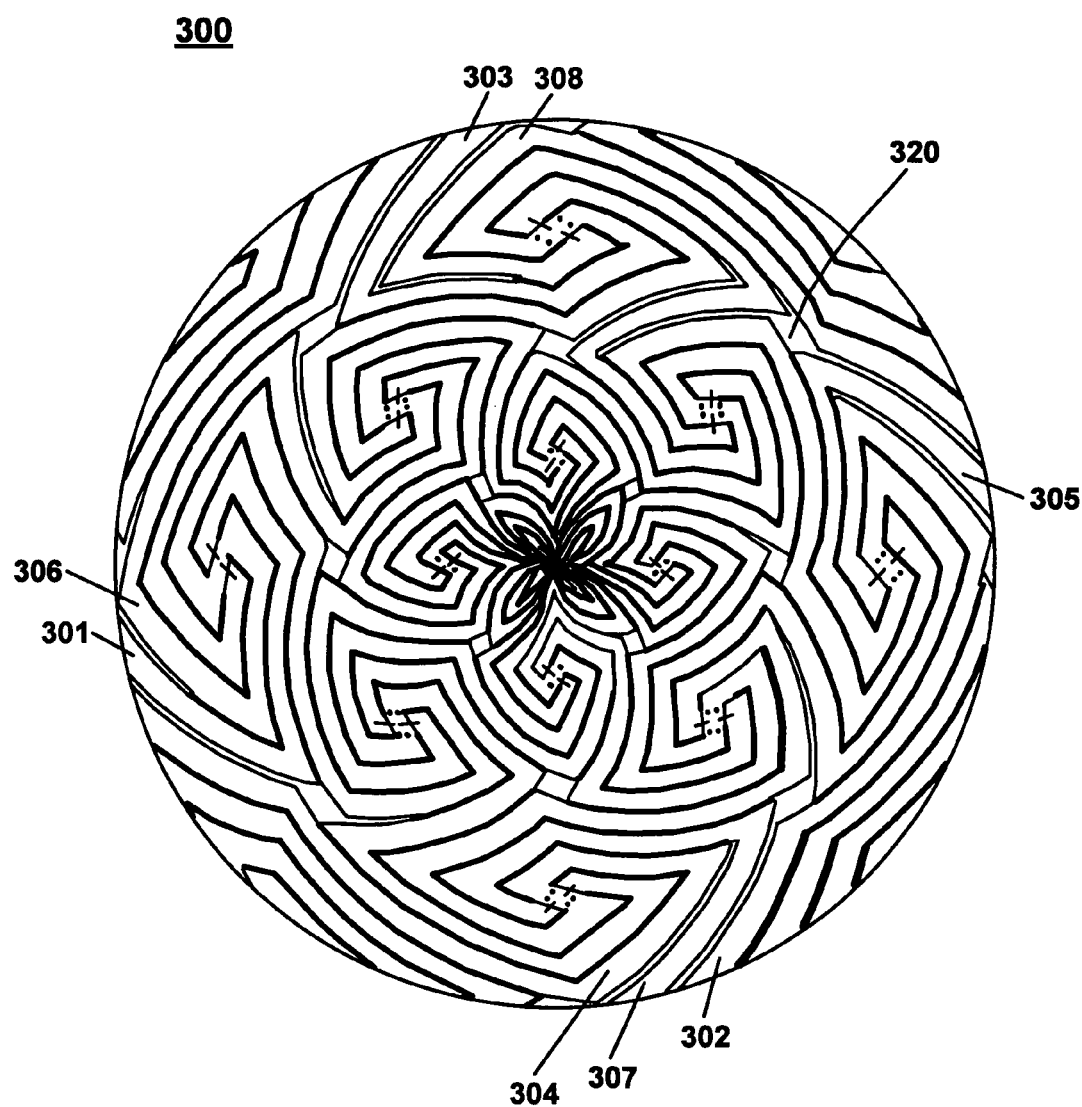
FIG. 3A illustrates a sensor pattern in accordance with another embodiment of the present invention.

FIG. 3A shows a sensor pattern 300 in accordance with another embodiment of the present invention. Sensor pattern 300 may be referred to as a polar intertwined spiral-like sensor pattern. In the example of FIG. 3A, there are eight sensor elements 301, 302, 303, 304, 305, 306, 307 and 308 (301-308); however, the present invention is not so limited. The sensor elements 301-308 can be composed of copper or other conductive material having similar characteristics. The sensor elements are electrically insulated from each other.

In an embodiment of the present invention, each sensor element 301-308 extends outward from the center of sensor pattern 300 in a spiral-like manner. This can be seen more clearly in FIG. 3C. In FIG. 3C, sensor element 303 is isolated from the other sensor elements in pattern 300.

In the example of FIG. 3A, the width of each sensor element 301-308 increases with its length. Thus, with reference to FIG. 3C, a greater capacitance will be induced in an outer portion of sensor element 303 than in an inner portion of sensor element 303, all other factors being equivalent.

The minimum width of the sensor elements, which is toward the center of sensor pattern 300 of FIG. 3A, is a design consideration. Thus, the sensor elements 301-308 may not extend all the way to the center of pattern 300, leaving a gap in the center. However, relative to the size of an object being sensed, the size of such a gap would be small. Furthermore, as described in conjunction with FIG. 1A, the position of the object can be readily identified as being at or near the center of sensor pattern 300.

In the example of FIG. 3A, one-half of the sensor elements (e.g., elements 301, 303, 305 and 307) extend outward from the center of pattern 300 in a spiral-like manner in a counterclockwise direction, while the other half of the sensor elements (e.g., elements 302, 304, 306 and 308) extend outward from the center of pattern 300 in a clockwise direction.

In the present embodiment, each of the sensor elements 301-308 is symmetrically related in some manner to each other sensor element. In the present embodiment, the subset of counterclockwise-spiraling sensor elements 301, 303, 305 and 307 have rotation symmetry (but not reflection symmetry), the subset of clockwise-spiraling sensor elements 302, 304, 306 and 308 have rotation symmetry (but not reflection symmetry), and the counterclockwise-spiraling sensor elements 301, 303, 305 and 307 and clockwise-spiraling sensor elements 302, 304, 306 and 308 exhibit reflection symmetry (but not rotation symmetry).

In an embodiment of the present invention, each portion of a sensor element is electrically connected to all the other portions of the sensor element. For example, although sensor element 303 of FIG. 3C appears to include segments or portions that are disconnected, those portions are in practice connected to the other portions by traces that tunnel under or bridge across any intervening sensor element(s). Each sensor element can be disposed in a single layer in which a carbon ink bridge is implemented. In an alternative embodiment, multiple layers can be employed, in which one sensor element is disposed in a layer that is beneath or above another.

Referring to FIG. 3A, the sensor pattern 300 can be used to implement a two-dimensional sensor design that is both symmetrical and balanced, in a manner similar to that described above in conjunction with FIG. 1A. In other words, the sensor elements 301-308 each have a substantially equal surface area, a substantially equal length, and a substantially equal sensitivity. Therefore, a measured background capacitance is substantially the same for each sensor element 301-308. Also, each sensor element 301-308 will respond in substantially the same manner to an object. As mentioned above, in one embodiment, the width of each sensor element 301-308 increases with its length. However, other embodiments in accordance with the present invention may utilize sensor elements of constant width or that have decreasing widths over their lengths.

Output signals from the sensor elements 301-308 are readily interpreted into a two-dimensional position by sensing circuitry coupled to the sensor elements. As previously described herein, to prevent ambiguous multiple location detection, each sensor trace 301-308 of FIG. 3A extends across an arc of not greater than 180 degrees. However, in an alternate embodiment, software can be modified to allow each sensor trace to extend further than the 180 degrees shown in FIG. 3A.

In the example of FIG. 3A, a gap (exemplified by gap 320) is present at locations within sensor pattern 300. However, relative to the size of an object being sensed, the size of gap 320 is small. As such, even in the presence of such a gap, the position of an object can still be accurately determined.

In an alternate embodiment, the sensor elements are shaped to fill the gaps. In the example of FIG. 3A, each gap is surrounded by four different sensor elements. In one embodiment, the shapes of the sensor elements are modified relative to the shapes shown in FIG. 3A, such that the gap is filled and the surface areas of the sensor elements remain substantially equal to each other.

Figure 3B:
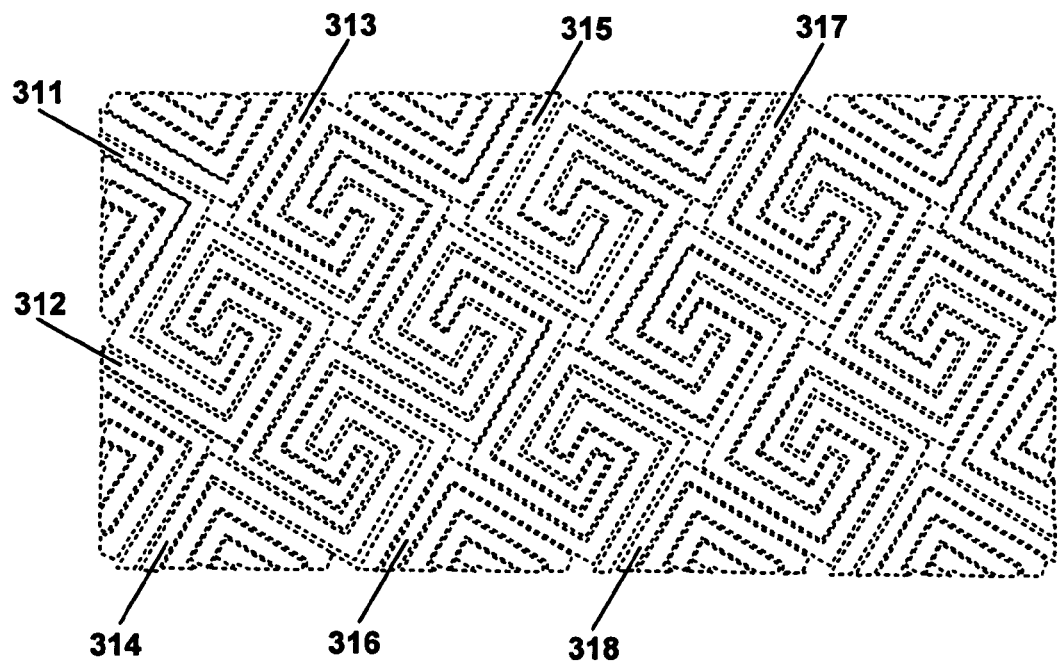
FIG. 3B illustrates the sensor pattern used in FIG. 3A shown in r-θ coordinate perspective, in accordance with an embodiment of the present invention.
Figure 3B:
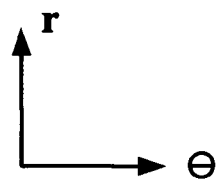
Figure 3C:
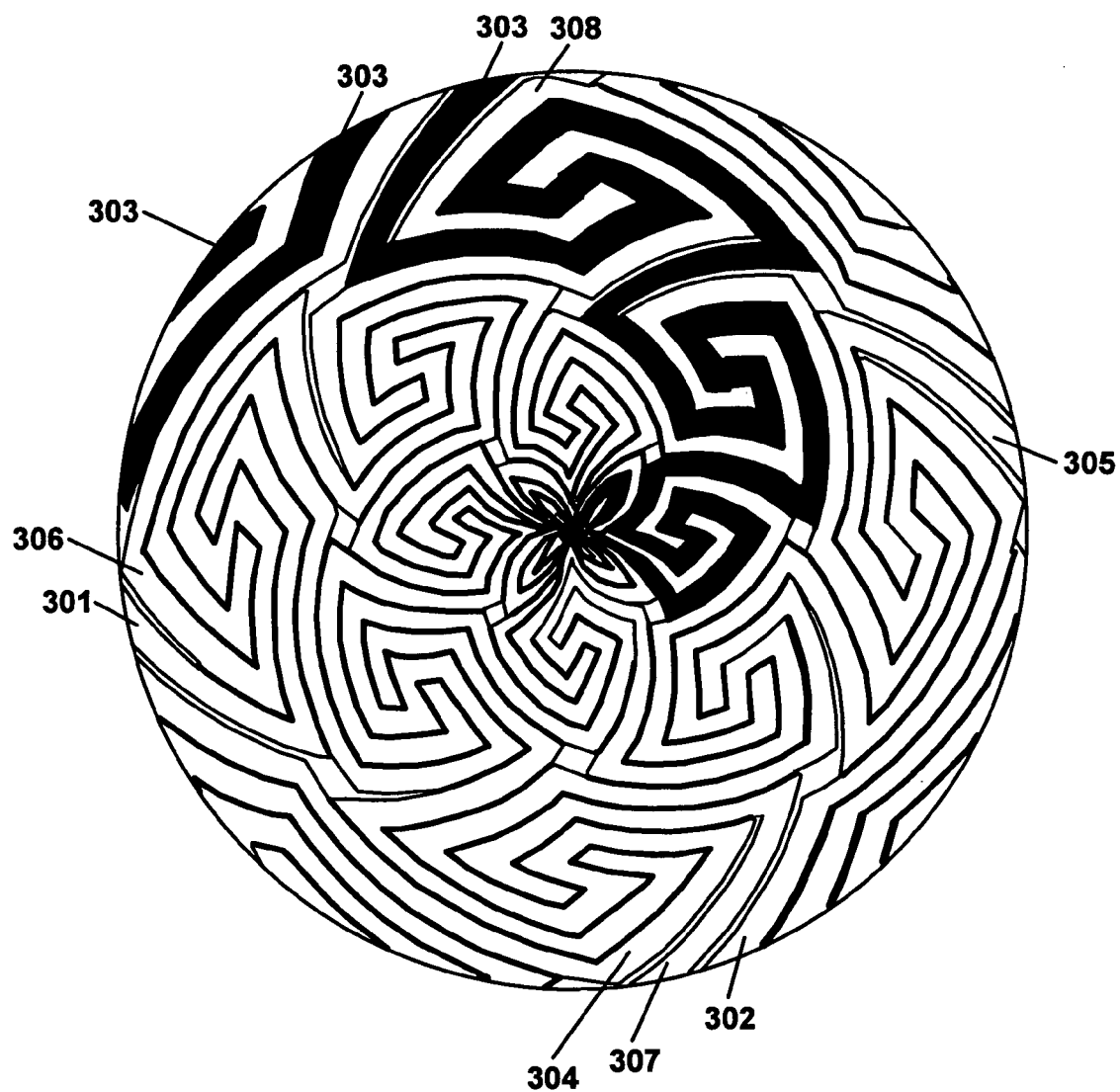
FIG. 3C highlights a sensor element in the sensor pattern of FIG. 3A.

FIG. 3B is an illustration of an intertwined spiral-like pattern 310 in an r-θ coordinate configuration. The polar intertwined spiral-like pattern appears rectangular when displayed on a graph with the r and θ axes. Intertwined spiral-like sensor pattern 310 in FIG. 3B shows a four-by-two section of a tiling intertwined spiral pattern rotated forty-five degrees relative to a conventional touchpad design. In the present embodiment, there are eight sensor elements 311, 312, 313, 314, 315, 316, 317 and 318. In intertwined spiral-like pattern 310, one-half of the sensor elements (e.g., elements 311, 313, 315 and 317) are in a right-to-left orientation, whereas the other half of the sensor traces (e.g., elements 312, 314, 316 and 318) are in a left-to-right orientation. By wrapping intertwined spiral-like sensor pattern 310 into an annular shape, the polar intertwined spiral-like sensor pattern 300 of FIG. 3A is produced.

Figure 4:
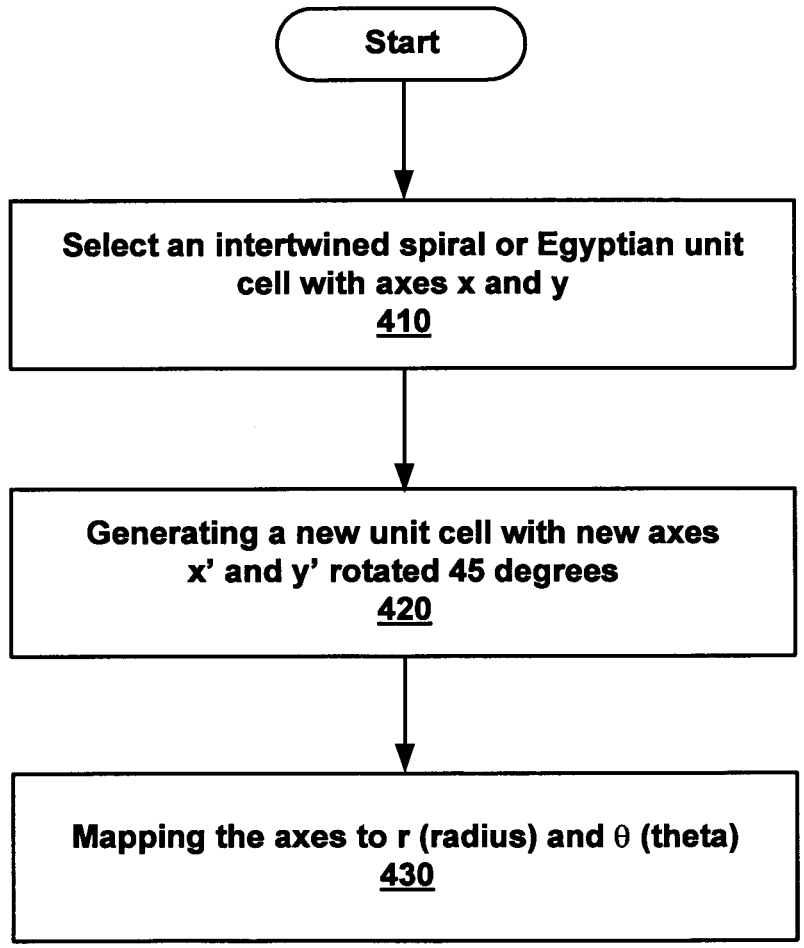
FIG. 4 is flowchart describing the geometric construction of the sensor pattern of FIG. 3A in accordance with an embodiment of the present invention.

A geometric construction can be used to generate the sensor pattern 300 from a rectilinear intertwined sensor pattern 310. FIG. 4 is a flowchart 400 describing the geometric construction of the sensor pattern 300 in accordance with an embodiment of the present invention.

In operation 410 of FIG. 4, a polar intertwined spiral unit cell (e.g., polar intertwined spiral-like sensor pattern 310 of FIG. 3B, or another type of intertwined spiral cell such as an interdigitated and intertwined unit cell) with axes u and v is selected.

In operation 420, a new unit cell is generated. This new unit cell has new axes (u' and v') that have been rotated 45 degrees.

In operation 430, the new axes (u' and v') are mapped to r (radius) and θ (theta), thus generating sensor pattern 300 of FIG. 3A.

In essence, sensor pattern 300 includes some number of intertwined sensor elements. Each sensor element extends outward from the center of the pattern in a spiral-like manner (either clockwise or counterclockwise). Each sensor element includes a number of segments, where those segments are connected in spiral-like patterns. In other words, with reference to FIG. 3C, sensor element 303 extends outward from the center of sensor pattern 300 in a spiral-like manner, and sensor element 303 includes a series of segments that are connected as a series of spiral-like patterns. Thus, sensor pattern 300 includes spiral-like sensor elements 301-308 that are arranged in a spiral-like pattern.

Figure 5:
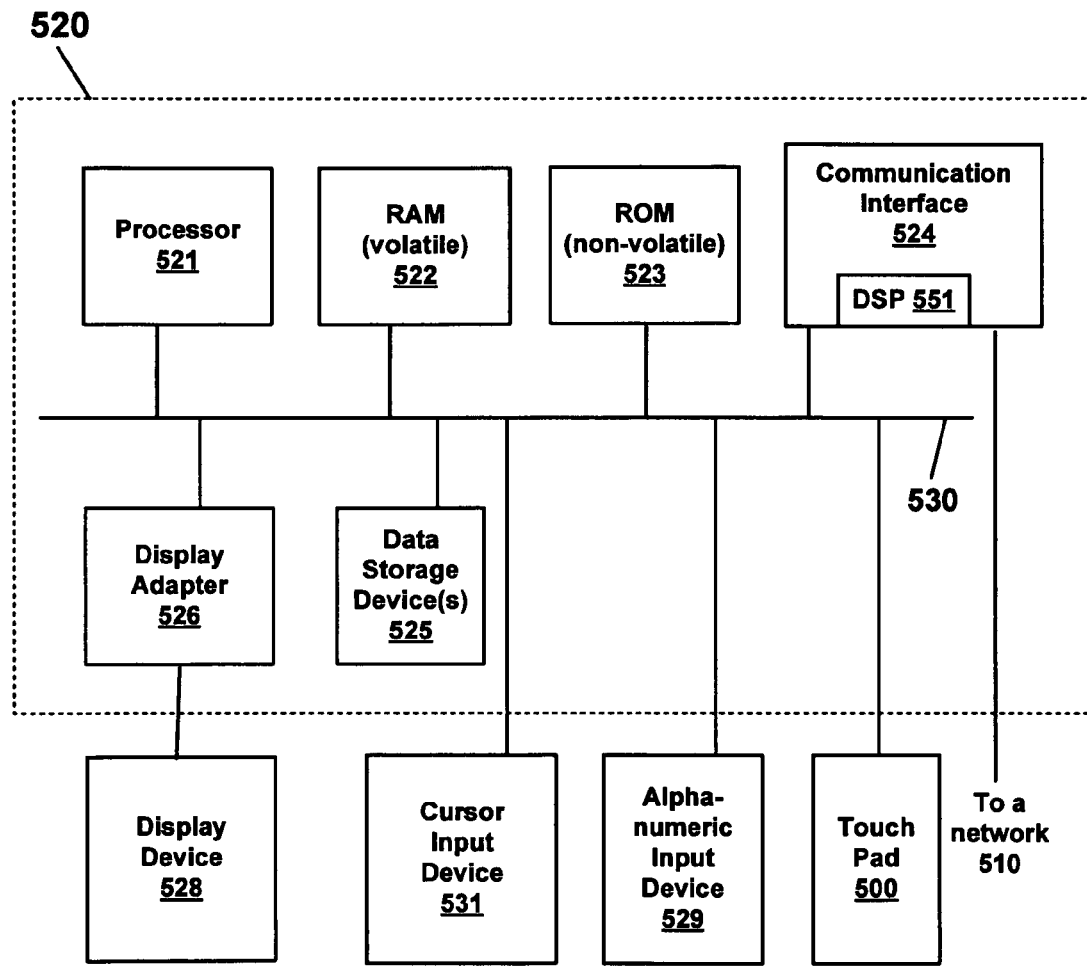
FIG. 5 is a block diagram of an exemplary electronic system upon which various embodiments of the present invention may be practiced.

FIG. 5 is a block diagram of an exemplary electronic system 520 in which various embodiments of the present invention may be implemented. In various embodiments, electronic system 520 can be, but is not limited to, a portable digital music player, a personal digital assistant (PDA), a laptop or desktop or other type of computer system, a touch screen display device, a digital camera, a digital printer, a DVD/CD player or any other electronic device that may benefit from the functionality provided by embodiments of the present invention. In an embodiment, electronic system 520 includes an address/data bus 530 for communicating information, at least one central processor 521 coupled with bus 530 for processing information and instructions, a volatile memory 522 (e.g., random access memory, RAM) coupled with the bus 530 for storing information and instructions for the central processor 521 and a non-volatile memory 523 (e.g., read only memory, ROM) coupled with the bus 530 for storing static information and instructions for the processor 521. Electronic system 520 also includes a data storage device(s) 525 coupled with the bus 530 for storing information and instructions. Data storage device 525 can be, but is not limited to, a magnetic hard drive, a hot swappable magnetic hard drive, an externally coupleable magnetic hard drive (e.g., a hard drive having USB or similar type connectivity), a USB memory drive, an optical storage device, e.g., a CD or DVD, or nearly any other storage device or combination of storage devices that can accessibly retain data and/or information and/or instructions. In an embodiment, electronic system 520 can have multiple data storage devices coupled therewith. Data storage device 525 can also be removable. Electronic system 520 also contains a display adapter 526 coupled to bus 530 for causing a display device, e.g., display device 528, to display information to a user of electronic system 520.

With reference still to FIG. 5, electronic system 520 can also include a communication interface 524 coupled to bus 530 for providing a communication link between electronic system 520 and any network environment, e.g., network 510 (not shown). Communication interface 524 can provide wireless and/or landline communication. Communication interface 524 can be, but is not limited to, an Ethernet adapter (wired or wireless), a IEEE 1394 adapter, a FireWire adapter, a modem (wired or wireless), a Bluetooth wireless communication circuit, a Satellite communication circuit, an RF (radio frequency) or infra-red wireless communication circuit or nearly any other wired or wireless communication circuit. In a wireless embodiment, communication circuit 524 can be coupled to an antenna (not shown) and provides the functionality to transmit and receive information over a wireless communication interface. As such, communication interface 524 enables central processor unit 521 to communicate, wirelessly or via a wire line, with other electronic systems coupled to a network, e.g., network 510. Network 510, to which electronic system 520 is communicatively coupleable, can be, but is not limited to, a PAN (personal area network), a LAN (local area network), a WAN (wide area network), or alternative network type that enables electronic system 520 to access or to be accessed from a LAN or the Internet. It is noted that a nearly endless variety of configurations, in nearly any combination, can be implemented within network 510 which can include, but which is not limited to, a peer-to-peer network, a client/server network, a token ring network, and the like.

In an alternative embodiment, electronic system 520 can include within communication circuit 524, an optional digital signal processor (DSP) 551 for processing data to be transmitted or data that are received via communication circuit 524. Alternatively, processor 521 can perform some or all of the functions performed by DSP 551.

Electronic system 520 further includes an optional cursor control or directing device, e.g., cursor input device 531, coupled to bus 530 for communicating user input information and command selections to processor 521. In one implementation, cursor input device 531 can be, but is not limited to, a mouse, a touchpad, a trackball, a scroll bar, a joystick or other cursor input device. In another embodiment, cursor input device 531 can be used as an on-screen cursor control device in conjunction with a touch screen device incorporated with display device 528. Cursor input device 531, when configured as an on-screen cursor control device, is capable of registering a position of an object on display device 528. The display device 528 utilized with servo writing system 520 may be a liquid crystal display (LCD) device, a cathode ray tube (CRT), a thin cathode ray tube (TCRT), a plasma display, a field emission display device (also called a flat panel CRT), a light emitting diode (LED) display or any other display device suitable for generating graphic images and alphanumeric characters recognizable to the user. Electronic system 520 further includes an alphanumeric input device 529 that, in one implementation, is a keyboard. Alphanumeric input device 529 can communicate information and command selections to processor 521. Alphanumeric input device 529 is coupled to bus 530 and includes alphanumeric and function keys.

Electronic system 520 additionally includes a touchpad 500 coupled to bus 530. In one embodiment, touchpad 500 utilizes polar diamond sensor pattern 100 of FIG. 1A. In an alternative embodiment, touchpad 500 utilizes polar intertwined spiral-like sensor pattern 300 of FIG. 3A.

When a polar diamond or a polar intertwined spiral-like sensor pattern (e.g., pattern 100 or 300) is implemented in a touchpad 500 in which the sensor is disposed beneath an opaque material, sensor patterns 100 and/or 300 can be composed of copper or similar conductive material, in accordance with various embodiments of the present invention. In an alternative embodiment, when sensor patterns 100 and/or 300 are implemented in a touchpad 500 in which the sensor pattern is disposed beneath a translucent or transparent material, sensor patterns 100 and/or 300 can be composed of indium tin oxide or other conductive material.

Figure 6:
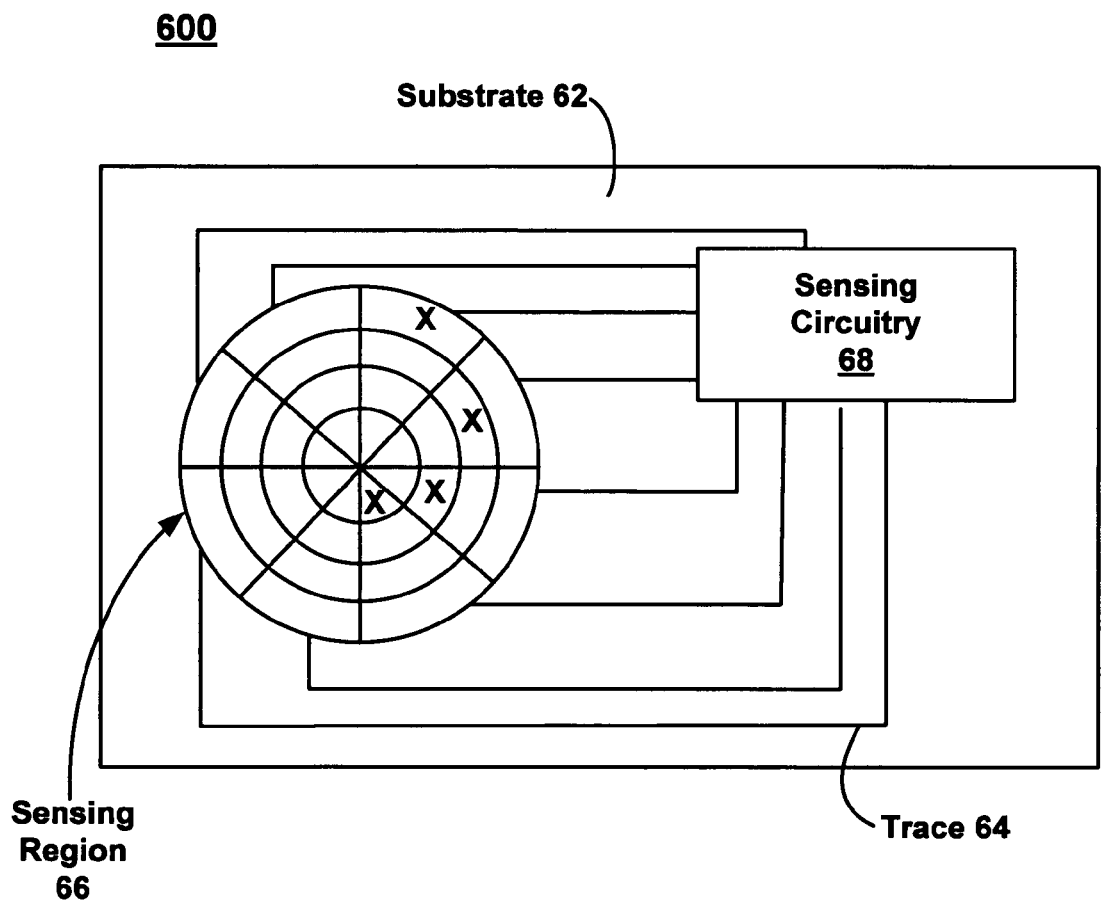
FIG. 6 is a plan view of a capacitive sensing apparatus in accordance with an embodiment of the present invention.

FIG. 6 is a plan view of an example two-dimensional capacitive sensor apparatus 600 that can be implemented using one or more embodiments of the present invention. The capacitive sensor apparatus 600 can be utilized to communicate user input (e.g., using a user's finger, a probe, etc.) to a computing device or other electronic device.

In the example of FIG. 6, the capacitive sensor apparatus 600 includes a substrate 62 on which electrically conductive coupling traces (exemplified by trace 64, and which may also be referred to as electrical conductors) are patterned or formed. Electrical conductors 64 can be utilized for coupling the sensor elements that form sensing region 66 with sensing circuitry 68, thereby enabling the operation of capacitive sensor apparatus 600. Electrical conductors 64 may each include one or more conductive coupling elements or traces. Embodiments of sensor element patterns in accordance with the invention, such as sensor patterns 100 and 300 of FIGS. 1A and 3A, can be implemented to form sensing region 66.

In one embodiment, each sensor element is connected to a respective electrical conductor. In the example of FIG. 6, sensing region 66 is formed using sensor pattern 100 of FIG. 1A. In the example of FIG. 6, the sensor element portions indicated by the letter "X" are connected in series to an electrical conductor or coupling trace. Each of the other sensor elements shown in FIG. 6 is similarly connected to a respective trace. Thus, in the example of FIG. 6, only eight traces are needed to connect the sensor elements to the sensing circuitry 68. In a similar manner, a sensing region 66 formed using sensor pattern 300 of FIG. 3A would need only eight traces. As mentioned above, embodiments in accordance with the present invention are not limited to eight sensor elements.

In one embodiment, the traces or electrical conductors can be implemented in two layers of substrate 62. More specifically, in the example of FIG. 6 but with reference also to FIG. 1A, the four coupling traces connected to the subset of counterclockwise-spiraling sensor elements 101, 103, 105 and 107 do not cross each other and so can be readily implemented in one layer of the substrate 62, and the four coupling traces connected to the subset of clockwise-spiraling sensor elements 102, 104, 106 and 108 do not cross each other and so can be readily implemented in a second layer of the substrate 62. In a similar manner, coupling traces can be connected to the sensor elements of sensor pattern 300 (FIG. 3A) in two layers of substrate 62. Sensor patterns 100 and 300 can thus be manufactured using conventional printed circuit board techniques to provide the sensor elements and coupling traces in the desired pattern on only two layers, helping to control manufacturing costs.

The coupling traces can be connected to the sensor elements in a manner other than that just described. For example, the sensor elements can be connected to coupling traces that pass through vias to sensing circuitry that is located underneath sensing region 66.

Capacitive sensor apparatus 600 can be implemented as a capacitive touch sensor device that can be placed over an underlying image or an information display device (not shown). In this manner, a user would view the underlying image or information display by looking through the substantially transparent sensing region 66. Alternatively, capacitive sensor apparatus 600 can be implemented as a touchpad or similar type of device, in which case substrate 62 can be implemented using one or more opaque materials.

In addition to determining position, or as an alternative to determining position, embodiments of the capacitive sensor apparatuses described herein can be used to detect movement, or a rate of movement, of an object relative to sensing region 66.

Figure 7:
FIG. 7 is a flowchart of a method for sensing an object using a capacitive sensing apparatus in accordance with an embodiment of the present invention.

FIG. 7 is a flowchart 700 of a method for sensing an object using a capacitive sensing apparatus in accordance with an embodiment of the present invention. Although specific steps are disclosed in flowchart 700, such steps are exemplary. That is, the present invention is well-suited to performing various other steps or variations of the steps recited in flowchart 700. It is appreciated that the steps in flowchart 700 may be performed in an order different than presented and that the steps in flowchart 700 are not necessarily performed in the sequence illustrated.

In block 71, output signals from one or more sensor elements are received at a sensing circuit. The sensor elements extend from a central position within a sensing region to the edges of the sensing region. The sensor elements include a first subset of sensor elements that extend spiral-like in a clockwise direction about the central position and a second subset of sensor elements that extend spiral-like in a counterclockwise direction about the central position.

In block 72, a position within the sensing region is determined by comparing measures of the outputs signals. In one embodiment, an object proximate to the sensing region will induce a capacitance (above the background capacitance) in some of the sensor elements. The magnitude of the capacitance induced on any one sensor element depends on how close the object is to that sensor element. The magnitude of the capacitance induced on any one sensor element also depends on where the object is along the length of that sensor element. Thus, with reference to FIG. 6, by comparing the capacitances (or current or voltage) present on each of the coupling traces (e.g., trace 64), sensing circuitry 68 can ascertain a position within sensing region 66.

In summary, embodiments of the present invention provide sensor patterns (e.g., pattern 100 or pattern 300) for implementation with, but not limited to, touchpads. Sensor patterns in accordance with the present invention advantageously provide symmetry and balance between the sensor elements. A further advantage is that embodiments of the present invention can accurately provide both radial and angle information that can be interconverted to a rectilinear coordinate system by a simple mathematical procedure.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The various embodiments were chosen and described in order to enable others skilled in the art to utilize the invention and various embodiments with various modifications. It is intended that the scope of the invention may be defined by the claims appended hereto and their equivalents.

What is claimed is:

1. A capacitance sensing apparatus comprising:
 a plurality of sensor elements extending in a radial direction from a shared center, said plurality of sensor elements comprising:
 a first subset of sensor elements that extend spiral-like in a clockwise direction; and
 a second subset of sensor elements that extend spiral-like in a counterclockwise direction, said second subset of sensor elements electrically insulated from said first subset of sensor elements, wherein a capacitance induced in a first sensor element of said first subset if an object is at a distance from said first sensor element and a capacitance induced in a second sensor element of said second subset if said object is at said distance from said second sensor element are substantially equal.

2. The apparatus of claim 1 wherein at least two sensor elements of said first subset have rotation symmetry about said center and wherein at least two sensor elements of said second subset have rotation symmetry about said center.

3. The apparatus of claim 1 wherein a sensor element of said first subset and a sensor element of said second subset have reflection symmetry.

4. The apparatus of claim 1 wherein an areal measure of a sensor element is substantially equal for each sensor element of said plurality of sensor elements.

5. The apparatus of claim 1 wherein a measure of capacitance, if measured in the absence of an object to be sensed, is substantially equal for each sensor element of said plurality of sensor elements.

6. The apparatus of claim 1 further comprising a deformable conductive surface in proximity to said plurality of sensor elements, wherein said sensor elements measure a change in capacitance induced if said conductive surface is deformed.

7. The apparatus of claim 1 wherein said plurality of sensor elements are deformable and further comprising a conductive surface in proximity to said plurality of sensor elements, wherein said sensor elements measure a change in capacitance induced if a sensor element is deformed.

8. The apparatus of claim 1 wherein said plurality of sensor elements are arranged in a pattern comprising a plurality of radiating segments and a plurality of concentric bands that intersect said radiating segments, wherein a first portion of a sensor element of said plurality of sensor elements is located within a first radiating segment and a first concentric band and wherein a second portion of said sensor element is located within a second radiating segment and a second concentric band, wherein said first and second radiating segments are adjacent each other and wherein said first and second concentric bands are adjacent each other.

9. The apparatus of claim 1 wherein said plurality of sensor elements comprise a first sensor element intertwined with a second sensor element, wherein said first and second sensor elements each comprise a series of segments connected in a series of spiral-like patterns.

10. The apparatus of claim 1, wherein each sensor element of said plurality of sensor elements increases in width along its outwardly spiraling length.

11. A method of sensing an object, said method comprising:
 receiving output signals from one or more of a plurality of sensor elements, wherein said sensor elements extend from a central position to the edges of said sensing region, wherein said sensor elements comprise a first subset of sensor elements that extend spiral-like in a clockwise direction about said central position and a second subset of sensor elements that extend spiral-like in a counterclockwise direction about said central position, and wherein said second subset of sensor elements is electrically insulated from said first subset of sensor elements, and wherein a deformable conductive surface is disposed in proximity to said plurality of sensor elements, wherein said sensor elements measure a change in capacitance induced if said conductive surface is deformed; and
 determining a position within said sensing region by comparing measures of said output signals.

12. The method of claim 11 wherein at least two sensor elements of said first subset have rotation symmetry about said central position and wherein at least two sensor elements of said second subset have rotation symmetry about said central position.

13. The method of claim 11 wherein a sensor element of said first subset and a sensor element of said second subset have reflection symmetry.

14. The method of claim 11 wherein a measure of capacitance, if measured in the absence of said object, is substantially equal for each of said sensor elements.

15. The method of claim 11 wherein a capacitance induced in a first sensor element if said object is at a distance from said first sensor element and a capacitance induced in a second sensor element if said object is at said distance from said second sensor element are substantially equal.

16. The method of claim 11 wherein said plurality of sensor elements are deformable and wherein said conductive surface is disposed in proximity to said plurality of sensor elements, wherein said sensor elements measure a change in capacitance induced if a sensor element is deformed.

17. The method of claim 11 wherein said sensor elements are arranged in a pattern comprising a plurality of radiating segments and a plurality of concentric bands that intersect said radiating segments, wherein a first portion of said sensor elements is located within a first radiating segment and a first concentric band and wherein a second portion of said sensor element is located within a second radiating segment and a second concentric band, wherein said first and second radiating segments are adjacent each other and wherein said first and second concentric bands are adjacent each other.

18. The method of claim 11 wherein said sensor elements comprise a first sensor element intertwined with a second sensor element, wherein said first and second sensor elements each comprise a series of segments connected in a series of spiral-like patterns.

19. A capacitance sensing apparatus comprising:
a plurality of sensor elements extending in a radial direction from a shared center, said plurality of sensor elements comprising:
a first subset of sensor elements that extend spiral-like in a clockwise direction; and
a second subset of sensor elements that extend spiral-like in a counterclockwise direction, said second subset of sensor elements electrically insulated from said first subset of sensor elements, wherein a measure of capacitance, if measured in the absence of an object to be sensed, is substantially equal for each sensor element of said plurality of sensor elements.

20. The apparatus of claim 19 wherein at least two sensor elements of said first subset have rotation symmetry about said center and wherein at least two sensor elements of said second subset have rotation symmetry about said center.

* * * * *

UNITED STATES PATENT AND TRADEMARK OFFICE
CERTIFICATE OF CORRECTION

| | | |
|---|---|---|
| PATENT NO. | : 8,854,333 B2 | Page 1 of 1 |
| APPLICATION NO. | : 11/511947 | |
| DATED | : October 7, 2014 | |
| INVENTOR(S) | : Bob Lee Mackey et al. | |

It is certified that error appears in the above-identified patent and that said Letters Patent is hereby corrected as shown below:

ON THE TITLE PAGE

Item (75) Inventor:   Add "Mykola Golovchenko, San Jose, CA (US)

Signed and Sealed this

Sixth Day of January, 2015

Michelle K. Lee
*Deputy Director of the United States Patent and Trademark Office*